US009158907B2

(12) United States Patent
Meacham

(10) Patent No.: US 9,158,907 B2
(45) Date of Patent: Oct. 13, 2015

(54) ALTERNATIVE UNLOCKING PATTERNS

(71) Applicant: Google Inc., Mountain View, CA (US)

(72) Inventor: John W. Meacham, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 51 days.

(21) Appl. No.: 13/957,495

(22) Filed: Aug. 2, 2013

(65) Prior Publication Data

US 2013/0318598 A1 Nov. 28, 2013

Related U.S. Application Data

(63) Continuation of application No. 13/428,619, filed on Mar. 23, 2012, now Pat. No. 8,504,842.

(51) Int. Cl.
*G06F 21/00* (2013.01)
*H04L 29/06* (2006.01)
*G06F 21/36* (2013.01)
*G06F 3/0488* (2013.01)

(52) U.S. Cl.
CPC .............. *G06F 21/36* (2013.01); *G06F 3/0488* (2013.01)

(58) Field of Classification Search
CPC ....................................................... G06F 21/36
See application file for complete search history.

(56) References Cited

U.S. PATENT DOCUMENTS 4,972,496 A 11/1990 Sklarew
4,988,981 A 1/1991 Zimmerman et al.
5,252,951 A 10/1993 Tannenbaum et al.
5,500,937 A 3/1996 Thompson-Rohrlich
5,864,635 A 1/1999 Zetts et al.
5,923,793 A 7/1999 Ikebata
6,057,845 A 5/2000 Dupouy
6,407,679 B1 6/2002 Evans et al.

(Continued)

FOREIGN PATENT DOCUMENTS

GB 2508016 5/2014
WO 2010/117642 10/2010
WO 2014/089763 6/2014

OTHER PUBLICATIONS

Office Action in United Kingdom Application No. 1305331.9, mailed Jul. 17, 2014, 2 pages.

(Continued)

*Primary Examiner* — Lisa Lewis
(74) *Attorney, Agent, or Firm* — Fish & Richardson P.C.

(57) ABSTRACT

Methods, systems, and apparatus, including computer programs encoded on computer storage media, for receiving, by a computing system that is locked, input from a user that provides an unlocking pattern. During entry of the unlocking pattern, a display of the computing system does not provide a visual indication of an action that will be performed upon the user completing the unlocking pattern. The computing system compares the provided unlocking pattern to a plurality of stored unlocking patterns to determine whether the provided unlocking pattern matches any of the stored unlocking patterns. The stored unlocking patterns are associated with respective actions that are performed upon completion of the respective unlocking patterns. The unlocking patterns are associated with a same level of unlocked security access to the computing system. The computing system responds by unlocking the computing system and performing the action that is associated with the matching unlocking pattern.

16 Claims, 7 Drawing Sheets

101
100
11:03 PM
Draw pattern to unlock
102
104
106
Access to device home screen (or last screen before locking)
108
110
Access to specific application program
Emergency Call

(56) References Cited

U.S. PATENT DOCUMENTS 6,493,464 B1 12/2002 Hawkins et al.
6,573,883 B1 6/2003 Bartlett
6,791,537 B1 9/2004 Shim et al.
6,983,061 B2 1/2006 Ikegami et al.
7,002,560 B2 2/2006 Graham
7,219,368 B2 5/2007 Juels et al.
7,315,944 B2 1/2008 Dutta et al.
7,322,524 B2 1/2008 Silverbrook et al.
7,372,993 B2 5/2008 Lagardere et al.
7,484,106 B2 1/2009 Rhoten et al.
7,657,849 B2 2/2010 Chaudhri et al.
7,940,250 B2 5/2011 Forstall
7,953,983 B2 5/2011 Holt et al.
8,036,433 B1 10/2011 Wolff
8,046,721 B2 10/2011 Chaudhri et al.
8,385,885 B2 2/2013 Hainzl
8,402,533 B2 3/2013 Lebeau et al.
8,528,072 B2 9/2013 Shi
2002/0032043 A1 3/2002 Ishikawa
2004/0034801 A1 2/2004 Jaeger
2004/0155909 A1 8/2004 Wagner
2004/0204123 A1 10/2004 Cowsky
2004/0212617 A1 10/2004 Fitzmaurice et al.
2005/0111736 A1 5/2005 Hullender et al.
2005/0212760 A1 9/2005 Marvit et al.
2005/0212911 A1 9/2005 Marvit et al.
2005/0253817 A1 11/2005 Rytivaara et al.
2005/0274796 A1* 12/2005 Miyashita .................... 235/382
2006/0075250 A1 4/2006 Liao
2006/0129832 A1 6/2006 Abedi et al.
2006/0174339 A1 8/2006 Tao
2006/0206717 A1 9/2006 Holt et al.
2006/0233464 A1 10/2006 Simmons
2006/0242607 A1 10/2006 Hudson
2006/0267967 A1 11/2006 Hinckley et al.
2006/0288313 A1 12/2006 Hills
2007/0150826 A1 6/2007 Anzures et al.
2007/0150842 A1 6/2007 Chaudhri et al.
2007/0177803 A1 8/2007 Elias et al.
2007/0268268 A1 11/2007 Allison
2007/0273674 A1 11/2007 Cohen et al.
2007/0283292 A1 12/2007 Bucher et al.
2007/0288868 A1 12/2007 Rhee et al.
2008/0094370 A1 4/2008 Ording et al.
2008/0137971 A1 6/2008 King et al.
2008/0191905 A1 8/2008 Martin et al.
2008/0220752 A1 9/2008 Forstall et al.
2008/0287169 A1 11/2008 Kim et al.
2008/0310602 A1 12/2008 Bhupati
2009/0003658 A1 1/2009 Zhang et al.
2009/0040215 A1 2/2009 Afzulpurkar et al.
2009/0061837 A1 3/2009 Chaudhri et al.
2009/0064055 A1 3/2009 Chaudhri et al.
2009/0094562 A1 4/2009 Jeong et al.
2009/0164467 A1 6/2009 Ala-Lahti
2009/0174677 A1 7/2009 Gehani et al.
2009/0207184 A1 8/2009 Laine et al.
2009/0265627 A1 10/2009 Kim et al.
2009/0265666 A1 10/2009 Hsieh et al.
2009/0288032 A1 11/2009 Chang et al.
2009/0289916 A1 11/2009 Dai
2010/0001967 A1 1/2010 Yoo
2010/0099394 A1 4/2010 Hainzl
2010/0127998 A1 5/2010 Hyun
2010/0146384 A1 6/2010 Peev et al.
2010/0146437 A1 6/2010 Woodcock et al.
2010/0159995 A1 6/2010 Stallings et al.
2010/0162169 A1 6/2010 Skarp
2010/0162182 A1 6/2010 Oh et al.
2010/0227640 A1 9/2010 Kim et al.
2010/0248689 A1 9/2010 Teng et al.
2010/0257490 A1 10/2010 Lyon et al.
2010/0262905 A1 10/2010 Li
2010/0269040 A1 10/2010 Lee
2010/0306705 A1 12/2010 Nilsson
2011/0041102 A1 2/2011 Kim
2011/0087970 A1 4/2011 Swink et al.
2011/0163972 A1 7/2011 Anzures et al.
2011/0271181 A1 11/2011 Tsai et al.
2011/0279384 A1* 11/2011 Miller et al. ................. 345/173
2011/0283241 A1 11/2011 Miller et al.
2012/0036556 A1 2/2012 LeBeau et al.
2012/0054057 A1 3/2012 O'Connell et al.
2012/0069231 A1* 3/2012 Chao ........................ 348/333.01
2012/0235790 A1 9/2012 Zhao et al.
2012/0293438 A1 11/2012 Chaudhri et al.
2013/0057496 A1* 3/2013 Hong et al. .................. 345/173
2013/0129162 A1* 5/2013 Cheng et al. ................. 382/124
2013/0222329 A1* 8/2013 Larsby et al. ................ 345/174

OTHER PUBLICATIONS

"Otaku, Cedric's weblog: Android's locking pattern", Sep. 17, 2008, 5 pages, printed: Jun. 18, 2012.

Steven Sinofsky, "Signing in with a picture password", 23 pages, Dec. 16, 2011, printed: 6119112.

Abdalla et al., "Provably Secure Password-based Authentication in TLS", posted at the eScholarship Repository, University of California, 2005, 13 pages.

Appert and Zhai, "Using strokes as command shortcuts: cognitive benefits and toolkit support." ACM 2009, Boston, Massachusetts, 2009, 10 pages.

Duncan et al., "Visual Security for Wireless Handheld Devices", available at http://bama.ua.edu/~joshua/archive/may04/Duncan%20et%20al.pdf , 9 pages, 2004.

Fast Company. "Samsung Shows One Future for Touchscreen Cellphones: Alphabet Gestures." [retrieved on Apr. 10, 2009] Retrieved from the Internet: <URL: http://www.fastcompnay.com/blog/kit-eaton/technomiz/samsung-shows-one-furture-touchsreen-cellphones-alphabet-gestures>, 2009, 2 pages.

Geibler, Jorg. "Gedrics: The Next Generation of Icons." German National Research Center for Computer Science (CMD), 1995, 7 pages.

Gross, Mark D. and Ellen Yi-Luen Do. "Drawing on the Back of an Envelope: A framework for interacting with application programs by freehand drawing." Design Mashing Group, Arch. Dept, University of Washington; 2000, 15 pages.

Grundel et al., "A Direct Manipulation User Interface for the Control of Communication Processes-Making Call Handling Manageable," Proceedings of the HCI International '99 (the 8th International Conference on Human-Computer Interaction) on Human-Computer Interaction: Communication, Cooperation, and Application Design, vol. 2, 1999, pp. 8-13.

"Handbook for the Palm Zire 71 Handheld" [online] Retrieved from the Internet: URL:http://www.palm.com/us/support/handbooks/zire71/zire71__hb__ENG.pdf [retrieved on Mar. 20, 2007], Jan. 1, 2003, 261 pages.

Jansen, "Authenticating Mobile Device Users Through Image Selection," available at http://csrc.nist.gov/groups/SNS/mobile__security/documents/mobile__devices/PPVisualAuthentication-rev-DS04.pdf, 10 pages, 2004.

Jermyn et al., "The Design and Analysis of Graphical Passwords", for Proceedings of the 8th USENIX Security Symposium, Aug. 23-26, 1999, 15 pages.

Lenahan, 'TheDailyBuggle.com' [online]. "How to customize and enhance the android lock screen," 2011, [retrieved on Mar. 5, 2013]. Retreived from the Internet: URL< http://www.thedailybuggle.com/customize-enhance-android-lock-screen/>. 4 pages.

Monson-Haefel, Richard. "Multitouch++: One Finger Gestures." Feb. 2, 2009 [retrieved Apr. 10, 2009] Retrieved from the Internet: URL:http://theclevermonkey.blogspot.com/2009/02/one-finger-gestures.html. 4 pages.

'Motorola' [online]. "Welcome to my moto care," 2012, [retrieved on Mar. 5, 2013]. Retreived from the Internet: URL< https://motorola-global-portal.custhelp.com/app/answers/detail/a__id/48498/~/droid-x---screen-lock-%28security-locks%3A-pattern,-pin-code,-passcode%29>. 3 pages.

Rogers, 'Tech-Recipes.com' [online]. "Android 2.2 (froyo): Use pattern, PIN or password for screen unlock security," website dated

(56) References Cited

OTHER PUBLICATIONS 2003-2013, [retrieved on Mar. 5, 2013]. Retreived from the Internet: URL<http://www.tech-recipes.com/rx/5901/android-2-2-froyo-use-pattern-pin-or-password-for-screen-unlock-security/>. 5 pages.

"Symbol commander," Retrieved from the Internet: http://web.archive.org/web/20041106050200/www.sensiva.com/symbolcommander/index.html, 2004, 2 pages.

Suo et al., "Graphical Passwords: A Survey", 21st Annual Computer Security Applications Conference, Dec. 5-9, 2005, 10 pages.

Tao, "Pass-Go, a New Graphical Password Scheme", theses as submitted to the Faculty of Graduate and Postdoctoral Studies for Electrical and Computer Engineering, University of Ottawa, Jun. 2006, 110 pages.

Wobbrock, Jacob O. Meredith Ringle Morris, and Andrew D. Wilson. "User-Defined Gestures for Surface Computing." ACM 2009; Boston Massachusetts, 2009, 10 pages.

International Preliminary Report on Patentability in International Application No. PCT/US2010/030417, dated Oct. 11, 2011, 6 pages.

International Search Report and Written Opinion in International Application No. PCT/US2010/030417, dated Jul. 23, 2010, 11 pages.

International Search Report and Written Opinion in International Application No. PCT/US2011/045928, dated Dec. 9, 2011, 14 pages.

International Preliminary Report on Patentability in International Application No. PCT/US2011/045928, dated Feb. 12, 2013, 7 pages.

Office Action in United Kingdom Application No. 1503421.8, mailed May 6, 2015, 2 pages.

* cited by examiner 660
662 PSTN
664 VoIP
666 Application Store
668 Internet
670 Personal Computer
672 Voice Recognition
674 Social Network
676 Contacts
678 Cloud-Based Applications
680 Mapping Service
682 Turn-by-Turn Directions
684 Streaming Media
686 Micro-Blogging Services
688 Search Engine
690 Server System
640
650
Network
652
610
612
614
616
618a
618b
618c
618d
620
622

ALTERNATIVE UNLOCKING PATTERNS

CROSS-REFERENCE TO RELATED APPLICATIONS

This application is a continuation application of and claims priority to U.S. application Ser. No. 13/428,619, filed on Mar. 23, 2012 entitled "Alternative Unlocking patterns," the entire contents of which are hereby incorporated by reference.

TECHNICAL FIELD

This document generally relates to physical security for computing devices.

BACKGROUND

A computing device can enter a locked state when it is not used for a while or when a user provides input that causes the computing device to enter the locked state. For example, a computing device may lock if a user presses a "lock" button, or if a determined amount of time passes since the user has provided any user input. While in the locked state, features of a computing device may be restricted. Certain limited features may be available, such as a display of the current time, and an ability to dial an emergency telephone number, while most features may be unavailable, such as access to contact data on the device and ability to interact with applications the user has loaded on the device. As such, a user may not be able to access the restricted features unless the user enters an unlocking pattern that causes the device to enter an unlocked state. A device that locks can prevent unauthorized users from accessing the restricted features. Further a device that locks can prevent a user from unintentionally providing user input and launching computing device actions (e.g., calling a person or visiting a website).

SUMMARY

This document describes a computing system that provides for alternative unlocking patterns. In general, a computing system may recognize multiple unlocking patterns. The unlocking patterns, when entered by a user, may perform different actions. For example, a first unlocking pattern may cause the computing system to unlock the computing system and display a home screen, while a second unlocking pattern may cause the computing system to unlock the computing system and automatically display a user interface for a particular application program (and perhaps launch the application if is not already active).

As additional description to the implementations described below, the present disclosure describes the following implementations:

Implementation 1 is a computer-implemented method. The method comprises receiving, by a computing system that is locked, input from a user that provides an unlocking pattern, wherein during entry of the unlocking pattern a display of the computing system does not provide a visual indication of an action that will be performed upon the user completing the unlocking pattern. The method comprises comparing, by the computing system, the provided unlocking pattern to a plurality of stored unlocking patterns to determine whether the provided unlocking pattern matches any of the stored unlocking patterns, the stored unlocking patterns being associated with respective actions that are performed upon completion of the respective unlocking patterns, the unlocking patterns being associated with a same level of unlocked security access to the computing system. The method comprises responding, by the computing system to a determination that the provided unlocking pattern matches one of the stored unlocking patterns, by unlocking the computing system and performing the action that is associated with the matching unlocking pattern.

Implementation 2 is the method of implementation 1, wherein the user is unable to access features of the computing system while the computing system is locked, and is able to access the features while the computing system is unlocked.

Implementation 3 is the method of implementations 1 or 2. The method further comprises receiving, by the computing system with an unlocking pattern configuration user interface, input from the user that specifies: (a) multiple of the stored unlocking patterns, and (b) the respective actions that are associated with the multiple unlocking patterns.

Implementation 4 is the method of any one of implementations 1 through 3, wherein receiving the input from the user that provides the unlocking pattern comprises receiving input from the user that specifies a numeric or alphanumeric code.

Implementation 5 is the method of any one of implementations 1 through 3, wherein receiving the input from the user that provides the unlocking pattern comprises receiving input from the user that contacts a touchscreen of the computing system and traces a path across the touchscreen.

Implementation 6 is the method of implementation 5, wherein at least two of the stored unlocking patterns identify paths that end with selection from the user of a same user interface element.

Implementation 7 is the method of implementation 5. The method further comprises, after the input from the user has completed tracing the path and while the input from the user remains in contact with the touchscreen, adding to a display on the touchscreen selectable user interface elements that were not displayed on the touchscreen during tracing of the path.

Implementation 8 is the method of implementation 7. The method further comprises identifying, by the computing system, that the input from the user releases contact with the touchscreen at one of the selectable user interface elements. The action is associated with the one selectable user interface element and is one of multiple actions that are respectively associated with the selectable user interface elements.

Implementation 9 is the method of implementation 8. The method further comprises, before the input from the user releases contact with the touchscreen at the one selectable user interface element, beginning to load multiple application programs, wherein the multiple application programs are application programs that are launched for display upon selection from the user of respective ones of the selectable user interface elements.

Implementation 10 is the method of any one of implementations 1-9. The method further comprises performing a second action as a consequence of receiving input from the user while the computing system is unlocked and after the action has been performed, wherein the second action is associated with a second unlocking pattern from the plurality of stored unlocking patterns so as to be performed upon completion of the second unlocking pattern.

Implementation 11 is the method of any one of implementations 1-10. Receiving the input from the user that provides the unlocking pattern is associated with selection from the user of at least four graphical interface elements.

Implementation 12 is a computer-implemented method. The method comprises receiving, by a computing system that is locked, input from the user that provides a first unlocking pattern and input from the user that provides a second unlocking pattern, wherein during entry of the unlocking patterns a display of the computing system does not provide a visual indication of an action that will be performed upon receiving input from the user that provides a valid unlocking pattern, wherein the computing system is responsive to both the first unlocking pattern and the second unlocking pattern so as to perform a first action or a second action based on the received unlocking pattern. The method comprises responding, by the computing system, to the input from the user that provides the first unlocking pattern by unlocking the computing system and performing a first action in order to provide unlocked security access to the computing system. The method comprises responding, by the computing system, to the input from the user that provides the second unlocking pattern by unlocking the computing system and performing a second action in order to provide the unlocked security access to the computing system.

Implementation 13 is the method of implementation 12. The method further comprises locking the computing system at some time after the first action has been performed, wherein the input from the user that provides the second unlocking pattern is received after the device has been locked at the some time.

Implementation 14 is the method of any one of implementations 12 through 13. The first action includes displaying a home screen user interface of the computing system. The second action includes displaying a user interface that is not the home screen user interface and that is a most-recent user interface that the computing system displayed before receiving the input from the user that provides the second unlocking pattern and while the computing system was unlocked.

Implementation 15 is the method of any one of implementations 12-14. The first action is performed without the user providing input subsequent to providing the first unlocking pattern. The second action is performed without the user providing input subsequent to providing the second unlocking pattern.

Implementation 16 is the method of any one of implementations 12-15. The method further comprises, while the computing system is unlocked after having performed the first action, performing the second action as a consequence of receiving input from the user that selects a user interface element that is associated with the second action.

Implementation 17 is a computerized system. The computerized system comprises a touchscreen for displaying user interfaces. The computerized system comprises a computer-accessible repository that stores information that identifies multiple unlocking patterns and associated actions. The computerized system comprises a computer, communicatively-connected to the touchscreen and the repository. The computer is configured to receive, while the computer is locked, input from a user that provides an unlocking pattern, wherein during entry of the unlocking pattern the touchscreen does not provide a visual indication of an action that will be performed upon completion of a valid unlocking pattern. The computer is configured to determine whether the provided unlocking pattern matches any of the multiple unlocking patterns. The computer is configured to, if the provided unlocking pattern matches a first of the multiple unlocking patterns, unlock the computer and perform a first action to display on the touchscreen a first user interface. The computer is configured to, if the provided unlocking pattern matches a second of the multiple unlocking patterns, unlock the computer and perform a second action to display on the touchscreen a second user interface, the second user interface being a user interface of an application program that the user is able to launch by selecting a user interface element that is displayed on the first user interface or another user interface that is navigable from the first user interface.

Implementation 18 is the system of implementation 17. The computer is configured to display multiple selectable user interface elements on the touchscreen upon determining that the provided unlocking pattern matches the second unlocking pattern, the multiple selectable user interface elements being associated with different user interfaces.

Implementation 19 is the system of implementation 18. The computer remains locked until the user selects one of the multiple selectable user interface elements.

Implementation 20 is the system of implementations 18 or 19. The user provides the unlocking pattern by contacting the touchscreen in a path that selects at least three graphical interface elements. The computer is configured to identify that the user has selected one of the multiple selectable user interface elements by identifying that the user moved the contact with the touchscreen from the path to the selected user interface element without releasing the contact with the touchscreen.

Particular implementations can, in certain instances, realize one or more of the following advantages. A user may provide an unlocking pattern that is specific to an application program in order to view the application program immediately upon unlocking the computing device. As such, the user may have quick access to the application program and may not need to unlock the device and thereafter select an icon for the application program from a home screen of the computing device or another screen of the computing device. In some examples, upon completion of the security pattern, the computing device may display multiple icons that the user can select without the user removing a finger from a touchscreen of the computing system. As such, in one gesture a user may enter the unlocking pattern and launch an application program.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
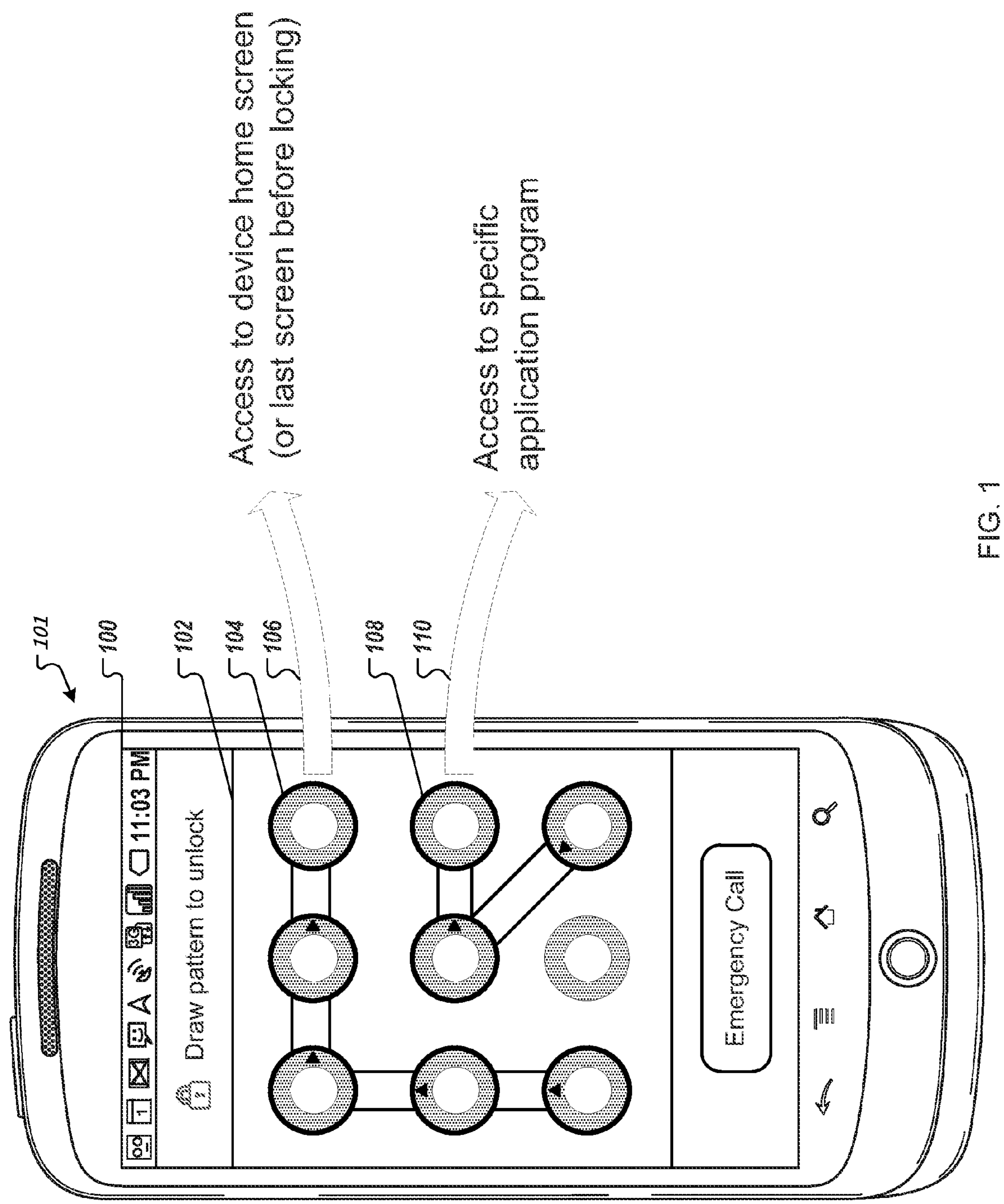
FIG. 1 is a diagram of an example touchscreen computing device that is displaying two different password shapes.

This document generally describes a computing system (e.g., a mobile telephone or tablet computer) that provides for alternative unlocking patterns. In general, a user of a computing system that is locked may unlock the system by providing any of multiple unlocking patterns, such as by tracing a pattern with their fingertip on a touchscreen display of a computing device. The unlocking patterns may be associated with different actions upon the system unlocking. For example, a first pattern may cause the system to display a "home screen." The home screen can display multiple icons that are available for the user to select in order to launch corresponding application programs. A second pattern may cause the system to automatically launch a particular one of the application programs and display the user interface for the launched application program, without requiring further input from the user. As such, when the computing system is locked, the user may be able to more quickly access the particular application program by entering the second pattern instead of entering the first pattern and thereafter selecting an icon to launch the particular application program.

More specifically, a computing system (also herein also referred to as a computing device) can enter a locked state. Such a locked computing system may prevent the user from accessing specific features of the computing system unless the user provides an unlocking pattern. For example, the computing system may be an application telephone that includes a touchscreen. When the system is locked, the user may not be allowed to call other telephones by entering numbers to dial the other telephones. Rather the user may only be able to use a telephone "emergency mode" in which the computing system may only call 911 and/or a predefined list of contacts. Moreover, when the computing system is locked, the user may not be able to access an email application program, compose text messages, play gaming application programs, or access a mapping application program, for example.

In order to access full system functionality, the user may have to provide a security pattern, or unlocking pattern. In some examples, the unlocking pattern is a numeric or alphanumeric code that the user enters using a physical or virtual keyboard. In some examples, the unlocking pattern is a predefined path that the user may enter by tracing a finger across a touchscreen display in conformity with the predefined path. For example, the predefined path can be a gesture that traces the path across an empty canvas (e.g., a blank display or a blank portion of the display). In other examples, the predefined path is traced among a grid of user interface elements in order to select a combination of the user interface elements in a particular order. For example, the user may drag his finger across the display and contact the displayed user interface elements (e.g., icons displayed in a grid) in a particular sequence in order for the entered unlocking pattern to be in conformity with a predefined path that specifies contact with the interface elements in the sequential order.

The system may compare an entered unlocking pattern to a repository of unlocking patterns stored on the system to determine if the entered unlocking pattern matches any of the patterns in the repository. The entered pattern may match a pattern in the repository if the entered pattern specifies a sequence of alphanumeric characters that are the same as the pattern in the repository. Alternatively, the entered pattern may match a pattern in the repository if the entered pattern specifies a sequence of user interface elements that the user contacted in an order, and the pattern in the repository also specifies the sequence of user interface elements in the order.

If the entered unlocking pattern does not match any of the patterns in the repository, the computing system may clear on the display an indication of the entered unlocking pattern. For example, the computing system may remove alphanumeric characters that the user had specified or asterisks that masked the alphanumeric characters that the user had specified. In examples in which the user drags his finger across a touchscreen display to trace a path, the computing system may remove an indication of the traced path from the display (e.g., one or more lines that represent movement of the user's finger across the touchscreen).

If the entered unlocking pattern does match one of the patterns in the repository, the computing system may unlock the computing system. Once the computing system is unlocked, the user may access computing system functions that were unavailable to the user when the computing system was locked. For example, once the computing system is unlocked the user may dial a telephone number by specifying a phone number, may view a list of contacts, may add contacts to the contacts list, may use a web browser application program, and may download and install new application programs for use by the computing system. As another example, once the computing system is unlocked, the user may create an additional and new unlocking pattern, and may assign an action to the additional unlocking pattern. In some examples, the user may create the additional unlocking pattern without re-entering a previously-created unlocking pattern. In other words, the user has already validated that he is authorized to access the full functionality of the computing system and does not need to re-enter an established unlocking pattern.

If the entered unlocking pattern matches one of the patterns in the repository, the computing system may further identify at least one action that is stored in association with the matching pattern. In some examples, an identified action indicates that the computing system is to display a "home screen" user interface of the computing device after unlocking the computing device. In such examples, the home screen may display after the user has completed entering the unlocking pattern and without the user providing subsequent user input.

A computing system's home screen may include multiple graphical interface elements that a user can select (e.g., by touching a region of a touchscreen that displays a user interface element) in order to launch an associated application program. In some examples, a computing system's home screen may be associated with a physical button of the computing system such that the computing system, when unlocked, displays the home screen user interface in response to user selection of the physical button. A home screen may be considered a "desktop" display of the computing system.

In some examples, the identified action is associated with a particular application program. For example, upon the user entering the unlocking pattern, the computing system may replace a user interface that is for user entry of the unlocking pattern with a user interface that is specified, at least in part, by the application program. Example application programs include a contacts list application program, a text messaging application program, an electronic mail application, a picture-taking application program, a web browser application program, and a voice commend entry user application program.

Should the user have entered an unlocking pattern that is associated with a display of the "home screen," the user may launch any of the above-described application programs by selecting a graphical interface element (e.g., an icon) that is displayed on the home screen for the application program, or by navigating to another screen (e.g., a screen that that lists all application programs that are installed on the computing system) and selecting the graphical interface element. The user may navigate to the other screen by selecting an "all application programs" user interface element.

In other words, entry of multiple different unlocking patterns may produce different actions, but may result in a same level of security access to the computing system. Thus, a user may have access to a same set of features regardless of which unlocking pattern the user enters. Having entered a first valid unlocking pattern, a user may not be prevented from accessing features (e.g., application programs or data that is displayed while an application program is executing) that are available to the user should the user enter a second valid unlocking pattern. An initial display that replaces the unlocking user interface, however, may be different and may depend on the entered unlocking pattern.

The computing system might not, during entry of a valid unlocking pattern, provide an indication of an action that will be performed upon completion of the valid unlocking pattern. For example, while the device is locked and while the user is entering the valid unlocking pattern (but before the user has completed entry of the valid unlocking pattern), the computing system might not display one or more graphical interface elements that illustrate actions that the computing system may perform upon entry of the valid unlocking pattern.

In some examples, the action that is performed upon entry of an unlocking pattern may not be apparent to a user until after the unlocking pattern is performed and the computing system unlocks the computing device. In these examples, the computing system might not display during entry of the unlocking pattern a visual indication of one or more user interface displays to be shown after the device has unlocked. Rather, the system may display a user interface for entering security patterns, but may not indicate (e.g., visually or audibly) how to perform a valid unlocking pattern from among a collection of possible unlocking patterns.

In other words, the computing system may enable the user to enter numerous (e.g., more than fifty) different combinations of unlocking patterns. Some of the unlocking patterns (e.g., three) may be recognized for unlocking the computing system and the others may not be recognized for unlocking the computing system. In some examples, the computing system may erase data that is stored on the computing system or prevent the user from entering another unlocking pattern for a specified amount of time (e.g., one minute) after detecting a predetermined number of incorrect unlocking patterns.

The computing system may re-enter the locked state after the user has unlocked the computing system. In some examples, this transition to the locked state occurs should the user not provide input for a predetermined amount of time. In some examples, this transition to the locked state occurs should the user provide input that specifies that the computing system should lock. For example, the computing system may include a physical or virtual button that, when selected, locks the computing system.

In some examples, after the user has entered a valid unlocking pattern, the computing system displays user selectable options for launching application programs. As an illustration, a user may physically contact a touchscreen of the computing system with his finger and trace his finger over a surface of the touchscreen. The user may trace his finger to contact graphical interface elements (e.g., by moving his finger over a display of the graphical interface elements) in a grid of graphical interface elements. If a path of the contacted graphical interface elements matches a path for a valid unlocking pattern, the computing system may access a list of one or more actions (e.g., application programs to launch) that are stored in association with the valid unlocking pattern.

The computing system may display selectable user interface elements for the accessed actions. These selectable user interface elements may not have been displayed (or may have been displayed but may not have been selectable) before the computing system determined that the user entered the valid unlocking pattern. In some examples, the user may select one of the user interface elements in order to cause the computing system to unlock and perform the action associated with the selected interface element. The user may select an element by dragging his finger across the touchscreen display and either contacting a region of the touchscreen that is displaying the interface element or releasing his finger from the display over the interface element.

In other words, the user may enter a security pattern by tracing his finger across a display, and may leave his finger in contact with the display after he has completed the unlocking pattern, in order to cause a display of icons for application programs, and in order to launch one of the application programs. As such, the user may both unlock the computing system and select to launch one of multiple displayed application programs without releasing his finger from the display. In some examples, the computing system performs a default action if the user enters the unlocking pattern but does not select one of the subsequently displayed graphical interface elements.

The selectable graphical interface elements may include indicia that indicate actions that are performed by a system upon user selection of the respective graphical interface element. For example, one interface element may include a depiction of a camera (for a picture taking application program) while another interface element may include a depiction of a telephone (for a telephone dialing application program).

In contrast, the user interface elements that are selected by a user as part of an unlocking pattern may not include indicia of actions. In some example, multiple of the user interface elements may appear the same. For example, a grid of selectable user interface elements for specifying a path may include user interface elements that appear the same. Additionally, a single graphical interface element in the grid may be associated with multiple unlocking patterns. For example, different unlocking patterns may trace different paths but end on the same graphical interface element.

FIG. 1 is a diagram of an example touchscreen computing device 101 that is displaying two different password shapes. A touchscreen 100 is shown here on a cellular telephone, but a similar touchscreen may be used on other types of computing devices, such as a tablet computer, a touch-enabled computer monitor, a dedicated electronic device (e.g. a radio, e-reader, or power meter), or a toy with a touchscreen. The touchscreen can display an updating user interface (UI) and can receive touch input from a user. The touch input can consist of one or more user fingers tapping, sliding, holding, or otherwise interacting with the touchscreen. Some touchscreens are configured to receive input from a stylus or other device, either in addition to or as an alternative to user touch input. The computing device containing the touchscreen can receive other forms of input and output using components that include hardware buttons, a scroll-ball, a power button, a speaker, and additional touchscreens.

The touchscreen 100 can display a welcome screen to a user. The welcome screen can indicate to the user that computing device is in a locked state, perhaps because it has been unused for a period of time or the user has pressed the power button to lock it. While displaying the welcome screen, the computing device may be limited to little or no input other than input to unlock the computing device. For example, this may allow the user to carry the computing device in a pocket without accidently dialing a phone number or launching an application.

One scheme for unlocking the computing device includes displaying a canvas 102 with interactive elements, and receiving user input that draws a password shape through those interactive elements. For example, when the user touches the first interactive element, the element may respond by lighting up and vibrating the phone. The user may then draw a password shape through other interactive elements by sliding the finger over other interactive elements to form the password shape. A path line or other UI element may track the user's movements, displaying the password shape as it is entered (and snapping each entered point to one of the displayed user interface elements). Lifting the finger from the touchscreen 100 can indicate that the password shape is complete.

Although a canvas 102 of interactive elements is shown here, other displays for receiving password information are possible. For example, a keypad of numeric or alphanumeric buttons may be shown. In such a situation, instead of drawing a pattern, the user input can tap a sequence of keys to type out a numeric or alphanumeric code. This code may be displayed in the canvas 102, either in cleartext (e.g. if the user presses "1", a 1 appears) or obfuscated (e.g. an additional * is shown for each successive key press). Although password shapes are usually described with respect to these figures below, it will be understood that other schemes, such as with numeric or alphanumeric codes, are also possible.

It is possible for the user to enter different password shapes in the canvas 102. For example, a password shape 104 and a password shape 108 may be drawn in the same canvas 102. Although they are shown through different interactive elements for clarity's sake, the password shapes may both pass through some or all of the same interactive elements of the canvas 102. In examples in which the password shapes include all of the same interactive elements, the password shapes may specify contact with the same interactive elements in different orders.

The different password shapes can cause the computing device to unlock into different states. The different states can include running or hiding a selected application (where different applications may constitute different end states), adjusting different control settings (e.g. with audio silenced or enabled), or using different homescreens. A homescreen may be considered a default or entry UI from which different features of a computing environment are accessible. The homescreen may have UI navigation controls to applications, settings and data. A user might have different homescreens for different usage scenarios. For example, a "work homescreen" might have shortcut links to a work email application, a remote datastore provided by an employer, and a folder with client contact information. Another "personal homescreen" may have a link to personal email, a folder with friend and family contact information, and a link to a media library. In addition, thematic material may be different for different homescreens, such as color schemes, sounds associated with user actions, and the like.

In the example shown, if the password shape 104 is entered, the computing device can perform transfer actions 106 from the locked state to a so-called "base" state, bringing the user to a homescreen (or alternatively the last screen displayed before the computing device was locked). If the user enters the password shape 108, the computing device can perform transfer actions 110 to a different state, for example, by launching a specific application program.

The computing device can be configured to reach some states by entering the base state and then executing one or more actions before displaying the unlocked computing environment to the user. In this example, the transfer actions 110 can include performing the transfer actions 106 and then launching the specific application. In effect, this may be similar to the behavior if the user entered the password shape 104, entered the unlocked computing environment, and then launched the specific application from a shortcut on the displayed homescreen.

Other instructions may be included in the transfer actions 110 as well. Consider an example of a delivery driver who often uses a cellphone for navigation instructions to addresses that the driver doesn't recognize. The driver may configure his cellphone so that the password shape 104 unlocks the phone to the homescreen, and the password shape 108 unlocks the cellphone and launches a navigation application. As such, the transfer actions 110 can include instructions to 1) turn on the cellphone's global positioning system (GPS) transceiver; 2) determine the cellphone's location; and 3) load the navigation application with instructions to display turn-by-turn navigation from the cellphone's location to a user-entered street address. By using the second password shape, the user can greatly reduce the number of input events needed for this user's common use scenario.

Figure 2B:
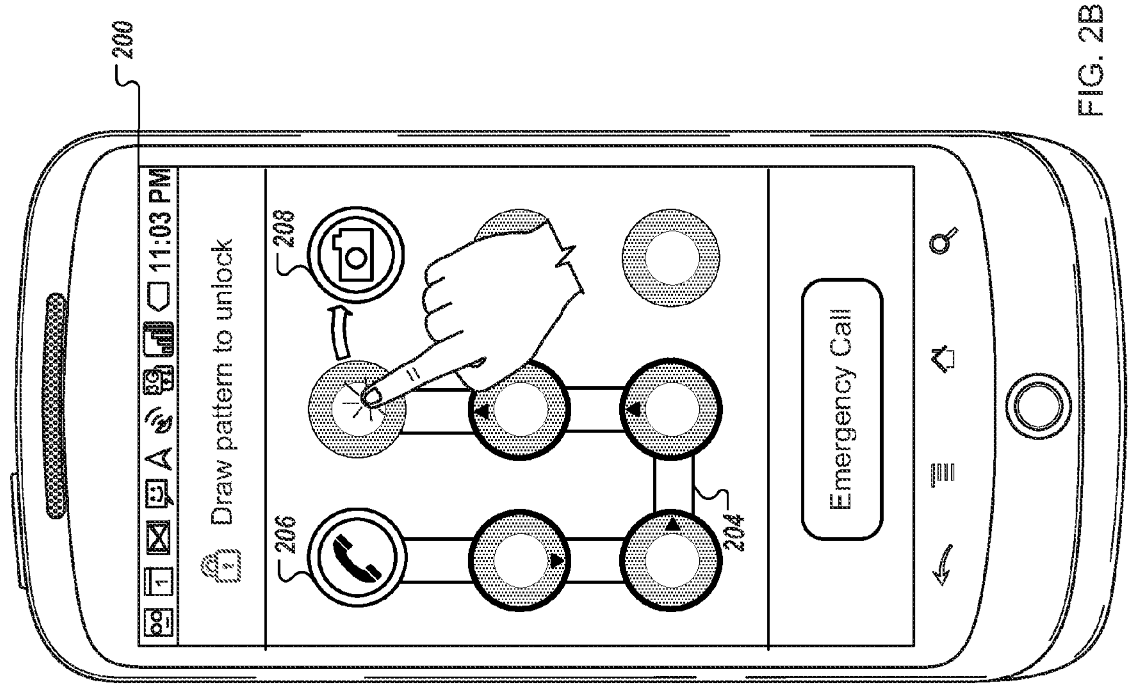
FIGS. 2A and 2B are diagrams of example user input to form password shapes.
Figure 2A:
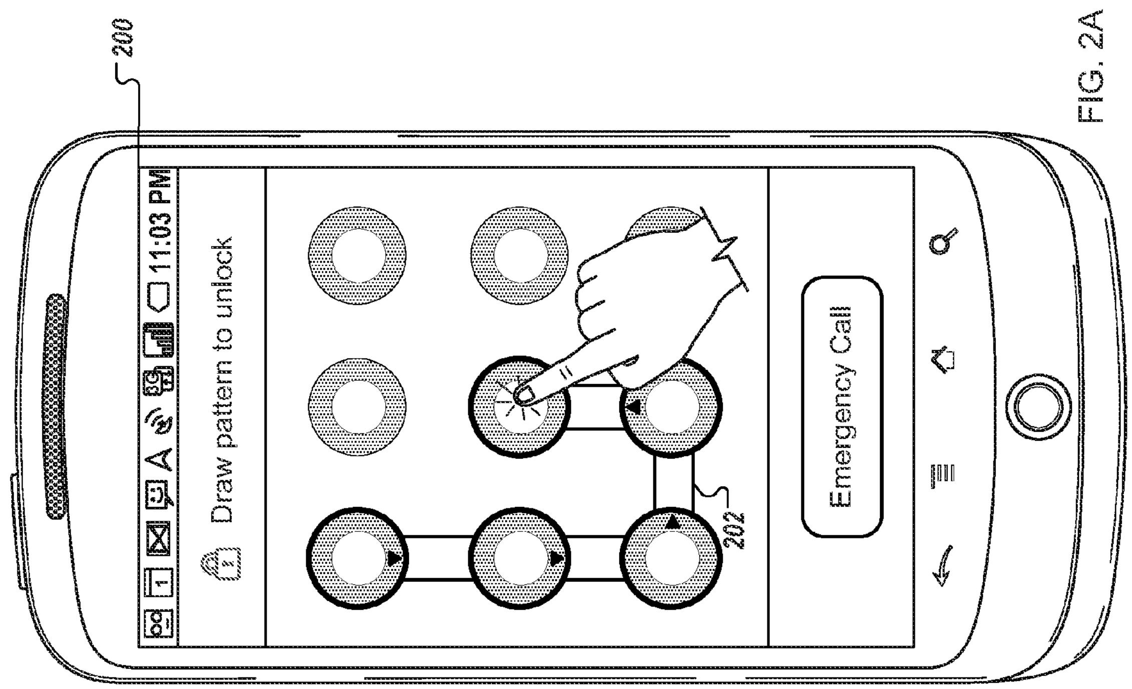

FIGS. 2A and 2B are diagrams of example user input to form password shapes. In this configuration, the user is presented with optional states to enter into once a password shape is completed. To begin, the user enters the partial password shape 202. The partial password shape includes all but the last interactive element of a password shape 204, If the user lifts the finger after completing the password shape 204, the cellphone can unlock into the base state, as previously described with reference to FIG. 1. However, in this example, the user may provide additional input to select a different state into which to unlock the cellphone. If the user continues to hold the finger on touchscreen 200 after completing the password shape 204, one or more interactive elements 206 and 208 can update to display indicia for an action, application, or other unlock state. In this example, the interactive element 206 shows a phone icon that indicates a dialer application, and the interactive element 208 shows a camera icon that indicates a camera or camcorder application.

The icons, and associated states, may be predetermined by the user or may be selected by the computing device. For example, the computing device may record the number of times each application program is launched in the unlocked environment or may record the two most recently used applications. These two recorded applications may be selected for the two interactive elements 206 and 208, providing the user with quick access to two applications that the user is likely interested in.

If the user continues to supply user touch input moving from the password shape 204 to one of the two altered interactive icons, the computing device can unlock into the associated state. In some configurations, the user must keep the finger in contact with the touchscreen 200 after completing the password shape 204 through touching one of the interactive elements, and must release the finger from the screen in order to select the interactive element. In other implementations, the user has a time window in which they may remove the finger from the touchscreen 200 and then select an altered interactive element. As shown here, interactive elements that are included in the password shape 204 may be altered.

Figure 3B:
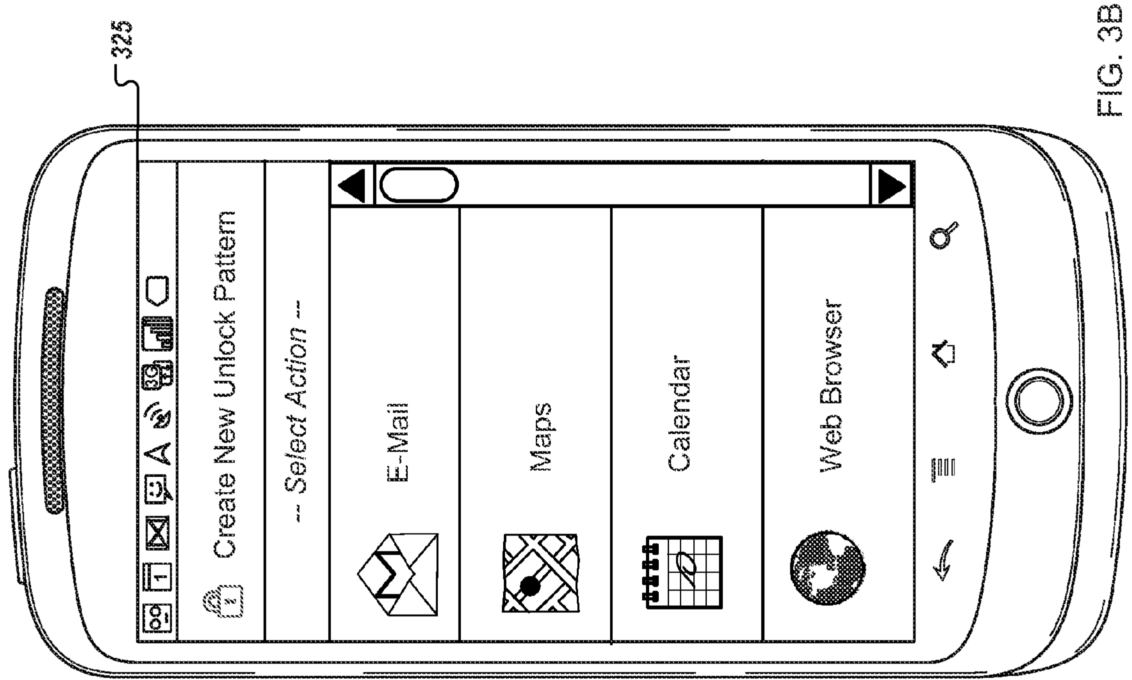
FIGS. 3A-3C are diagrams of example user interfaces for mapping actions to password shapes.
Figure 3A:
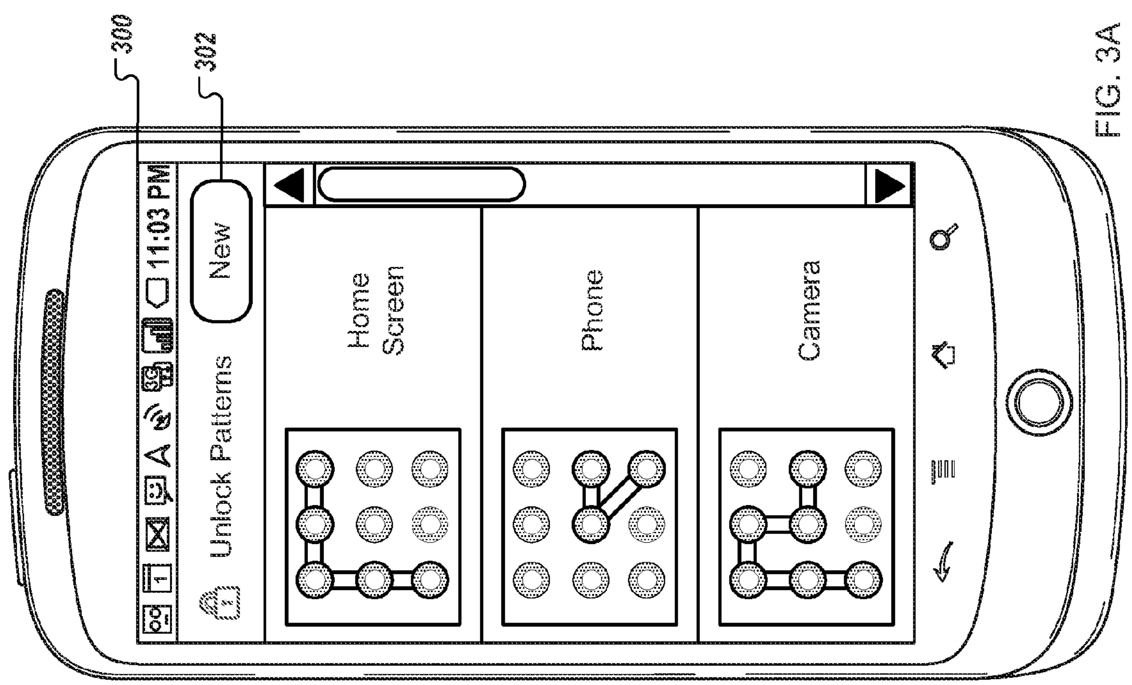
Figure 3C:
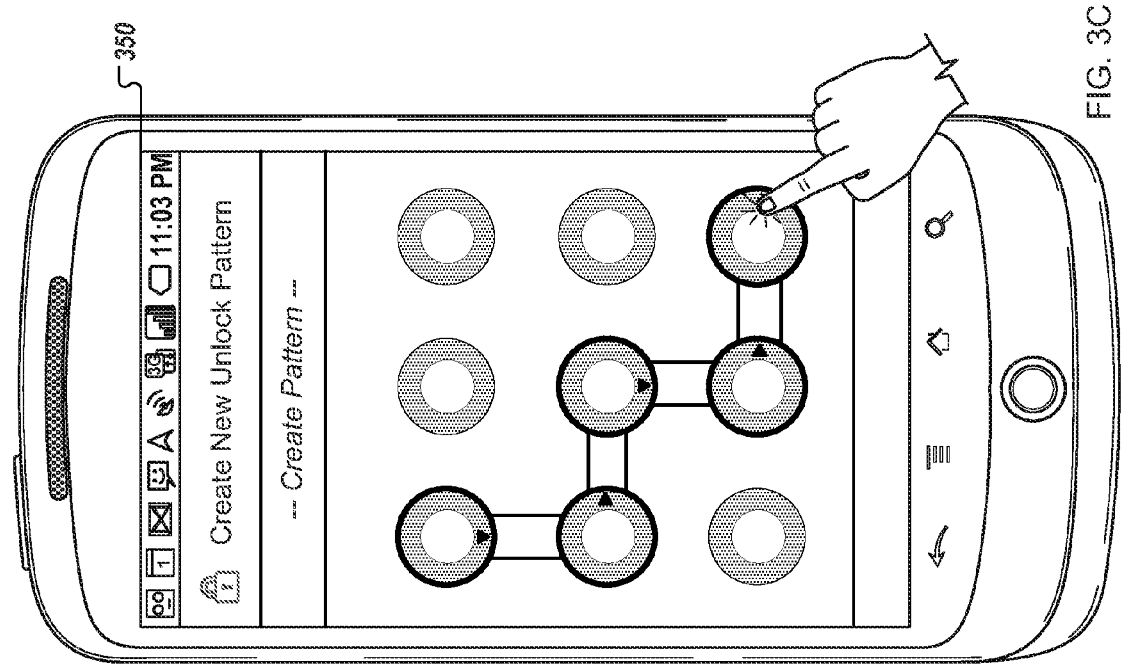

FIGS. 3A-3C are diagrams of example UIs 300, 325, and 350 for mapping actions to password shapes. Here, the user has already unlocked the computing device and has access to normal user environment operations (e.g. applications, settings, and data). The user interface 300 may be reached, for example, by navigating through system settings menus to a 'security' or 'unlock' section.

The UI 300 displays a list of recorded password shapes and their associated states. These password shapes and states may have been previously entered by the user and used to unlock the computing device to eventually reach this UI 300. The user may edit or delete one of the pairs of password shape/states though the UI 300. For example, the user may press-and-hold on one of the display rows, and an edit UI may launch.

A "new" button 302 allows the user to select a new action and input an associated new password shape. In the example that follows, the user selects an action first, and then inputs an associated new password shape. However, the system could be configured to receive the new password shape first, or to receive both through the same UI, thus receiving both in the same screen in the order of the user's choice.

By pressing the "new" button 302, the user can load the UI 325 for creating a new password shape. In the UI 325, the user can be presented with a list of actions, settings, applications, or other state-controlling elements. In some implementations, the computing device keeps an internal list of such elements and uses them for this and other uses. For example, when a user performs a press-and-hold input on a home-screen, the computing device may offer the list as possible shortcut icons to be created and placed on the homescreen.

In addition to selecting one of the elements of the list, the user may also supplement a selection with additional data. For example, the user may select the "Web Browser" entry with a press-and-hold input. This may call up an address dialog, where the user can supply a web URI. In doing so, the user not only indicates that the phone should unlock into a state with the web browser open, but that the web browser should also begin fetching the supplied URI. In some configurations, a user supplied script file can be selected as an action or as supplemental data (e.g. the URI) for a selection.

After the user selects a state-controlling element from the UI 325, the UI 350 can be displayed for receiving the new password shape. The user can enter a new password shape through interactive elements in the same process as entering a password shape to unlock the computing device, as previously described in FIG. 1. Once entered, the user can be prompted to enter the same pattern again, to ensure that they did not miss-key the input or forget it after entering.

The computing device may check the new password shape against the collection of password shapes already on file. If the new password shape is a match for any previously recorded password shapes, the new password shape may be rejected. However, in other configurations, identical password shapes are permitted and handled as previously described in FIG. 2. If the newly entered password shape is accepted, it may be used from the unlock screen to unlock the computing environment and transition to the state selected in UI 325, as previously described in FIGS. 1 and 2.

Figure 4:
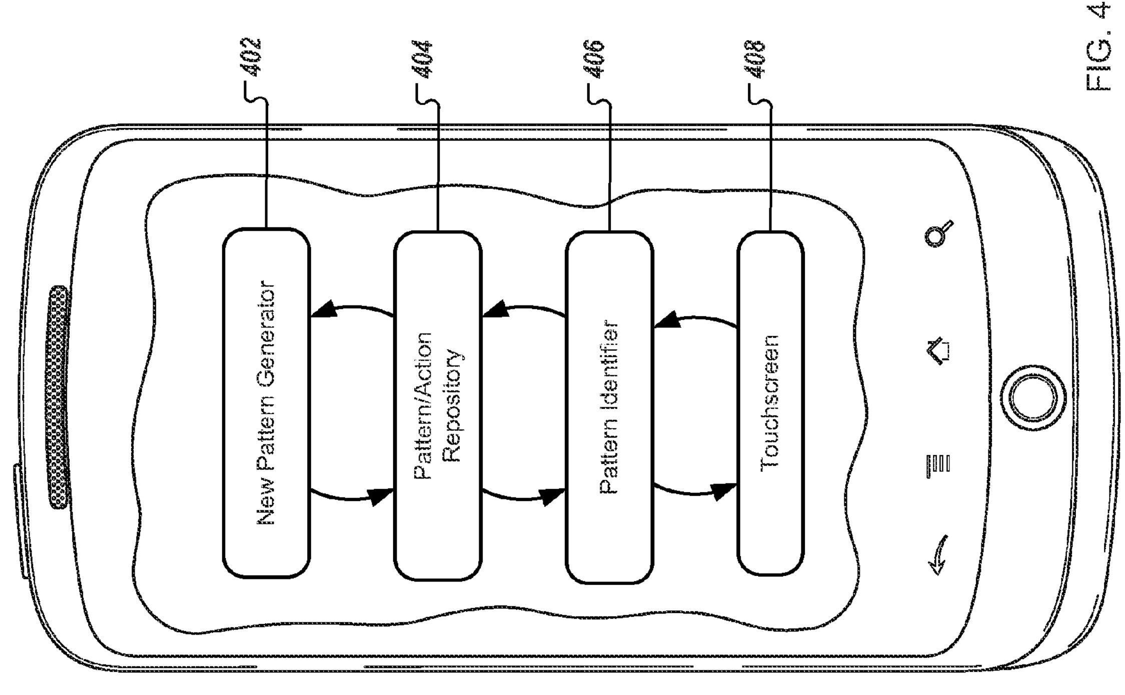
FIG. 4 is a block diagram of an example computing device configured to recognize password shapes.

FIG. 4 is a block diagram of an example computing device 400 configured to recognize password shapes. The computing device 400 may be used, for example, to provide the UIs 100, 200, 300, 325, and 350. For purposes of illustration, FIGS. 3A-3C will be used as a basis of an example to describe the computing device 400, but one or more other computing devices can be used to provide the UIs 100, 200, 300, 325, and 350, and other UIs may be used by the computing device 400.

A new pattern generator 402 may receive user input specifying a new password shape and may generate data that identifies the new password shape. For example, each password shape may be stored as a word of up to nine characters with values 0-9. Each interactive element is assigned a value from 1 to 9 and is stored in the word in order selected, with 0 padding the end of the word if needed. In the UI 350, the topmost left interactive element may be assigned the 1 value, with each interactive element to the right and then down receiving the next highest value, to the bottommost right interactive element being assigned the value 9. In this example, the password shape in the UI 350 would generate the word "145890000." In other configurations, other data formats may be used.

A pattern/action repository 404 can store an association of one or more unlock states (e.g., actions to implement the states) to data of the respective password shapes (e.g., data of the new password shape received from the new pattern generator 402). The stored association of the one or more states may be based off user input into the UI 325. When the user selects an entry, supplies supplemental data, or supplies a user script, the pattern/action repository may convert that input into computer readable data that identifies the user input action. In some configurations, this computer readable data may be in the same format as the user script provided by the user, and may include a copy of the user script. The computer readable data may specify an order in a series of actions, as well as the actions.

A pattern identifier 406 can identify password shapes input using a touchscreen 408, possibly in the same format as the data of the new password shapes. The pattern identifier 406 can compare the data of the received password shapes with all saved password shapes. If a match is found, the pattern identifier 406 can begin a process to unlock the computing device 400, followed by actions specified for the entered pattern in the repository 404. In this way, the computing device 400 can unlock into the state specified by the user.

Figure 5:
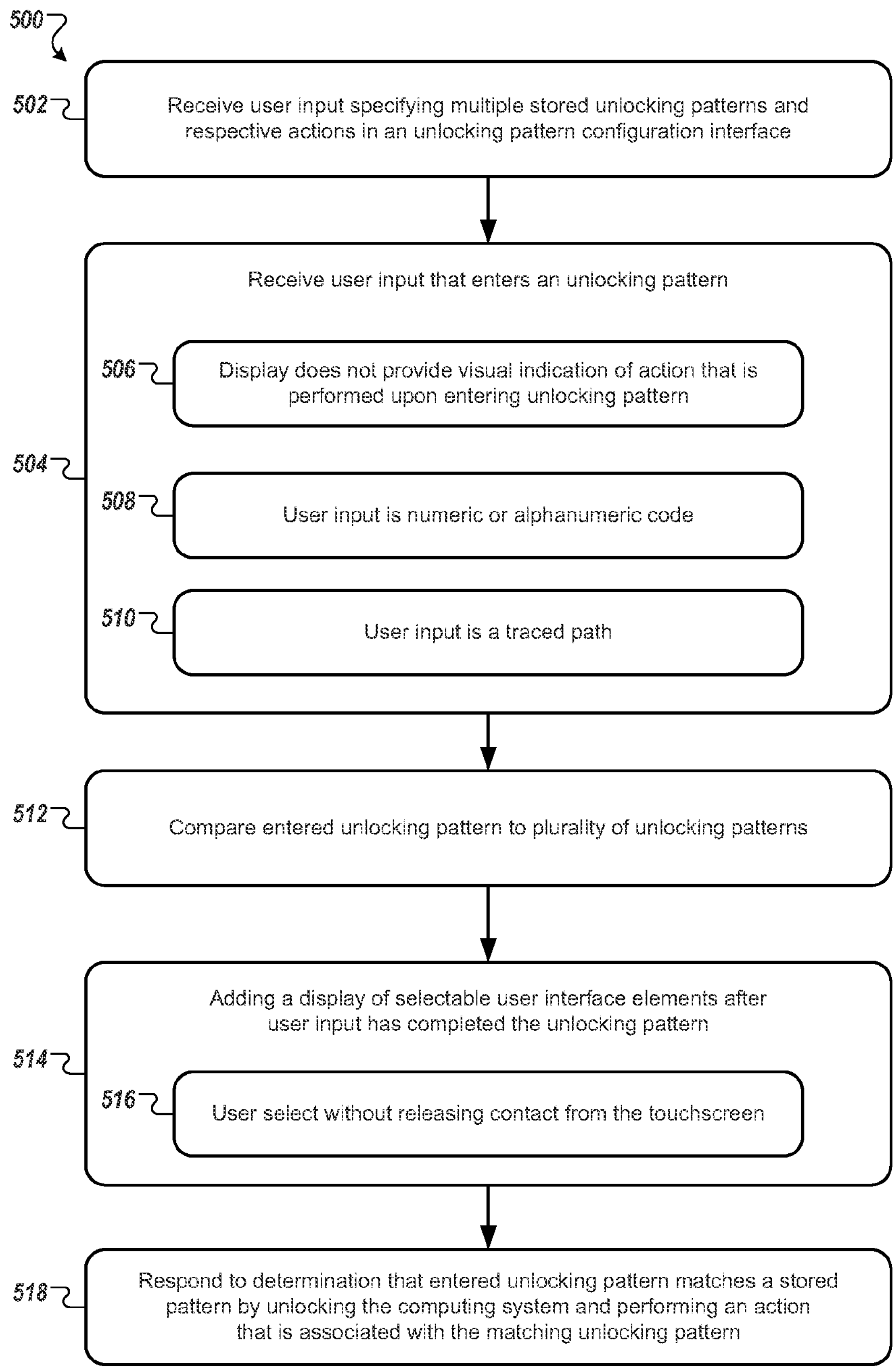
FIG. 5 is a flowchart of an example process for receiving user input and unlocking a computing environment.

FIG. 5 is a flowchart of an example process 500 for receiving user input and unlocking a computing environment. The process 500 can be performed by, for example, the computing device 400. For the purposes of illustration, FIG. 4 will be used as a basis of an example to describe the process 500, but one or more other computing devices may be used to perform the process 500.

User input specifying multiple stored unlocking patterns and respective actions is received in an unlocking pattern configuration interface (box 502). For example, the new pattern generator 402 and the pattern/action repository 404 may use the UIs 300, 325, and 350 to receive input from a user specifying a group of password shapes and associated computing environment states. Additionally, this information may be collected by the computing device 400 from a data repository. For example, the computing device 400 may periodically back up user data including password shapes and unlock states. If the user wishes to move his data to a new computing device, or if the computing device 400 is erased, this backup data may be copied over and utilized.

User input that enters an unlocking pattern is received (box 504). For example, the touchscreen 408 may receive user input in the form of a finger swiped through one or more interactive elements. This input may be converted by the pattern identifier 406 into, for example, an alphanumeric code uniquely identifying the password shape entered by the user.

In some implementations, the display does not provide visual indication of action that is performed upon entering the unlocking pattern (box 506). For example, different password shapes may be tied to different unlock states, but the touchscreen 408 may not provide any indications that a password shape is correct or incorrect until the user finalizes the inputting of the password shape. This may prevent a malicious user from discovering that there are multiple valid password shapes, providing for heightened security while using the computing system. After a password shape has been received, the computing system may alter one or more interactive elements displayed on the touchscreen 408 with indications of states that are available after unlocking. The user may select one of these interactive elements to unlock the computing system into a particular state.

In some implementations, user input is numeric or alphanumeric code (box 508). For example, instead of receiving a password shape at the touchscreen 408 and converting it to a numeric or alphanumeric code at the pattern identifier 406, the touchscreen 408 can display an alphanumeric or numeric keypad. Here, the touchscreen 408 can receive the numeric or alphanumeric code directly and pass it to the pattern identifier 406.

In some implementations, the user input is a traced path (box 510). The traced path can include a user swiping a finger through one or more interactive elements, or swiping a shape on a blank canvas. The pattern drawn by the user can be converted into machine readable data describing the password shape.

The entered unlocking pattern is compared to a plurality of unlocking patterns (box 512). For example, the pattern identifier 406 can look up the code of the entered password shape in the pattern/action repository 404. If the pattern identifier 406 finds one or more matches, the associated unlock states are identified for use.

A display of selectable user interface elements is added after user input has completed the unlocking pattern (box 514). For example, the pattern identifier 406 can pass graphical icons of the identified unlock states to the touchscreen 408. The touchscreen can reconfigure the unlock screen to display those icons as user-selectable interactive elements.

A user can select the interactive elements without releasing contact from the touchscreen (box 516). After the touchscreen 408 has been updated, the user may drag the finger from the end of the password-pattern to one of the user-selectable interactive elements, indicating that the user wishes to unlock the computing device 400 into the state visually identified by the one user-selectable interactive element. If the user wishes to enter the 'base' state, such as the default homescreen, the user may instead lift the finger from the touchscreen 408 without selecting any of the newly displayed icons.

In respond to a determination that entered unlocking pattern matches a stored pattern, the computer system unlocks and performs an action that is associated with the matching unlocking pattern (box 518). If the user selects one of the user-selectable interactive elements or lifts the finger without selecting one, the computing device 400 can unlock into the indicated states. This unlocking process can include processing one or more scripts, launching an application, adjusting a setting, etc.

Figure 6:
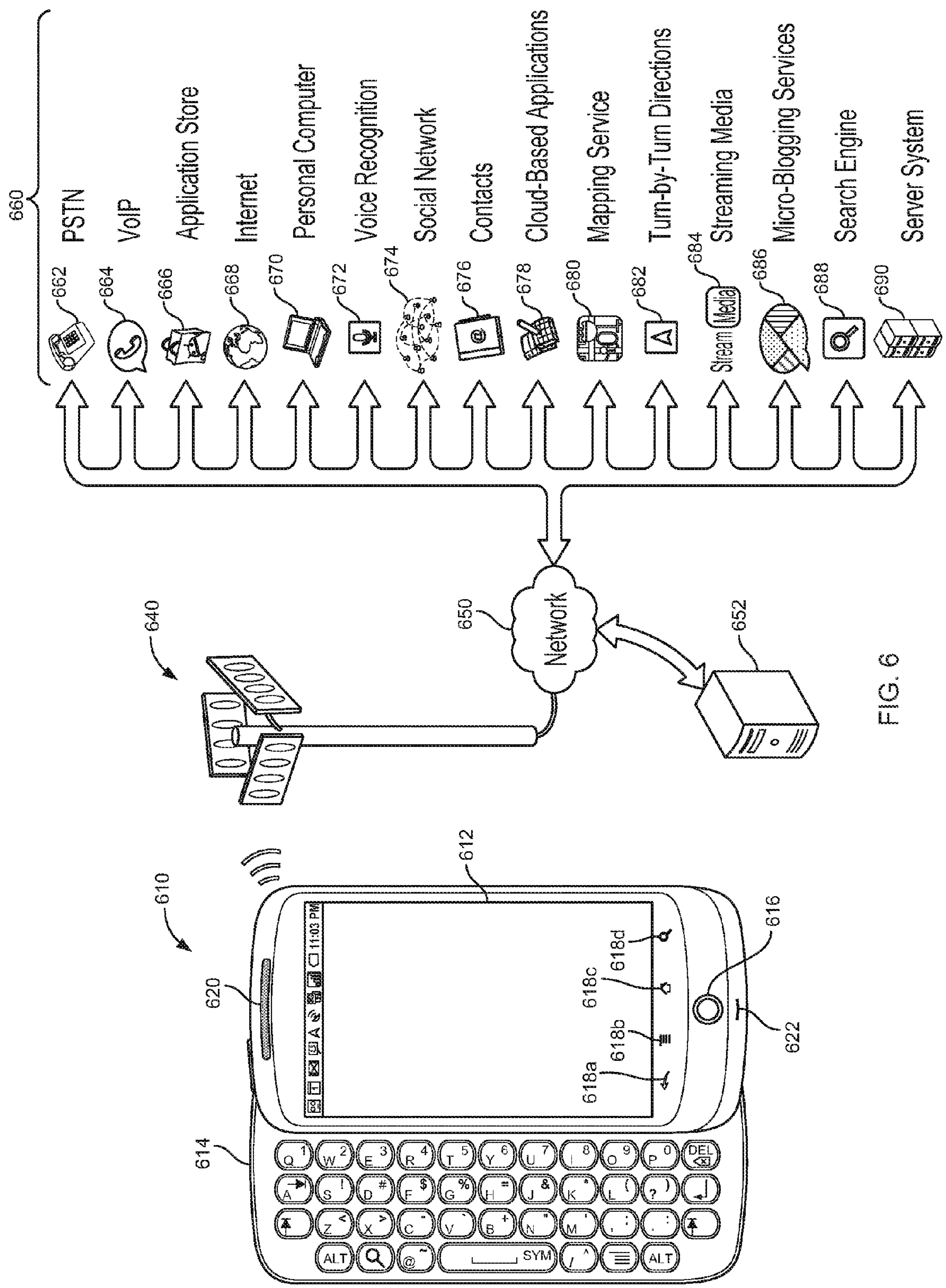
FIG. 6 is a conceptual diagram of a system that may be used to implement the systems and methods described in this document.

Referring now to FIG. 6, a conceptual diagram of a system that may be used to implement the systems and methods described in this document is illustrated. In the system, mobile computing device 610 can wirelessly communicate with base station 640, which can provide the mobile computing device wireless access to numerous hosted services 660 through a network 650.

In this illustration, the mobile computing device 610 is depicted as a handheld mobile telephone (e.g., a smartphone, or application telephone) that includes a touchscreen display device 612 for presenting content to a user of the mobile computing device 610 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 614, physical buttons, trackballs, accelerometers, gyroscopes, and magnetometers).

Example visual output mechanism in the form of display device 612 may take the form of a 3.7 or 4.3 inch LED or AMOLED display with resistive or capacitive touch capabilities, for displaying video, graphics, images, and text, and coordinating user touch input locations with the location of displayed information so that user contact at a location of a displayed item may be associated with the item by the device 610. The mobile computing device 610 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 614, which may be a full qwerty keyboard or a traditional keypad that includes keys for the digits '0-9', '*', and '#.' The keyboard 614 receives input when a user physically contacts or depresses a keyboard key. User manipulation of a trackball 616 or interaction with a track pad enables the user to supply directional and rate of rotation information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618*a-d*. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Some examples of operating systems include the ANDROID mobile device platform; APPLE IPHONE/MAC OS X operating systems; MICROSOFT WINDOWS 6/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 604. User-selection of the button may invoke the pre-defined action.

In some examples, the operating system provides a "desktop" user interface that is displayed upon turning on the mobile computing device 610, activating the mobile computing device 610 from a sleep state, upon "unlocking" the mobile computing device 610, or upon receiving user-selection of the "home" button 618*c*. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 610 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 612 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 610 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 610 may include other application modules and hardware. A call handling unit may receive an indication of an incoming telephone call and provide a user the capability to answer the incoming telephone call. A media player may allow a user to listen to music or play movies that are stored in local memory of the mobile computing device 610. The mobile telephone 610 may include a digital camera sensor, and corresponding image and video capture and editing software. An internet browser may enable the user to view content from a web page by typing in an addresses corresponding to the web page or selecting a link to the web page.

The mobile computing device 610 may include an antenna to wirelessly communicate information with the base station 640. The base station 640 may be one of many base stations in a collection of base stations (e.g., a mobile telephone cellular network) that enables the mobile computing device 610 to maintain communication with a network 650 as the mobile computing device is geographically moved. The computing device 610 may alternatively or additionally communicate with the network 650 through a Wi-Fi router or a wired connection (e.g., Ethernet, USB, or FIREWIRE). The computing device 610 may also wirelessly communicate with other computing devices using BLUETOOTH protocols, or may employ an ad-hoc wireless network.

A service provider that operates the network of base stations may connect the mobile computing device 610 to the network 650 to enable communication between the mobile computing device 610 and other computerized devices that provide services 660. Although the services 660 may be provided over different networks (e.g., the service provider's internal network, the Public Switched Telephone Network, and the Internet), network 650 is illustrated as a single network. The service provider may operate a server system 652 that routes information packets and voice data between the mobile computing device 610 and computing devices associated with the services 660.

The network 650 may connect the mobile computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the mobile computing device 610. Conversely, the mobile computing device 610 may send a communication to the service provider server system 652 initiating a telephone call with a telephone number that is associated with a device accessible through the PSTN 662.

The network 650 may connect the mobile computing device 610 with a Voice over Internet Protocol (VoIP) service 664 that routes voice communications over an IP network, as opposed to the PSTN. For example, a user of the mobile computing device 610 may invoke a VoIP application and initiate a call using the program. The service provider server system 652 may forward voice data from the call to a VoIP service, which may route the call over the internet to a corresponding computing device, potentially using the PSTN for a final leg of the connection.

An application store 666 may provide a user of the mobile computing device 610 the ability to browse a list of remotely stored application programs that the user may download over the network 650 and install on the mobile computing device 610. The application store 666 may serve as a repository of applications developed by third-party application developers. An application program that is installed on the mobile computing device 610 may be able to communicate over the network 650 with server systems that are designated for the application program. For example, a VoIP application program may be downloaded from the Application Store 666, enabling the user to communicate with the VoIP service 664.

The mobile computing device 610 may access content on the internet 668 through network 650. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

A voice recognition service 672 may receive voice communication data recorded with the mobile computing device's microphone 622, and translate the voice communication into corresponding textual data. In some examples, the translated text is provided to a search engine as a web query, and responsive search engine search results are transmitted to the mobile computing device 610.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members. For example, advertisement and news article content may be selected for the user based on a level of interaction with such content by members that are "close" to the user (e.g., members that are "friends" or "friends of friends").

The mobile computing device 610 may access a personal set of contacts 676 through network 650. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program. Example cloud-based application programs include GOOGLE DOCS word processor and spreadsheet service, GOOGLE GMAIL webmail service, and PICASA picture manager.

Mapping service 680 can provide the mobile computing device 610 with street maps, route planning information, and satellite images. An example mapping service is GOOGLE MAPS. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program. Example services that provide streaming media include YOUTUBE and PANDORA.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 7:
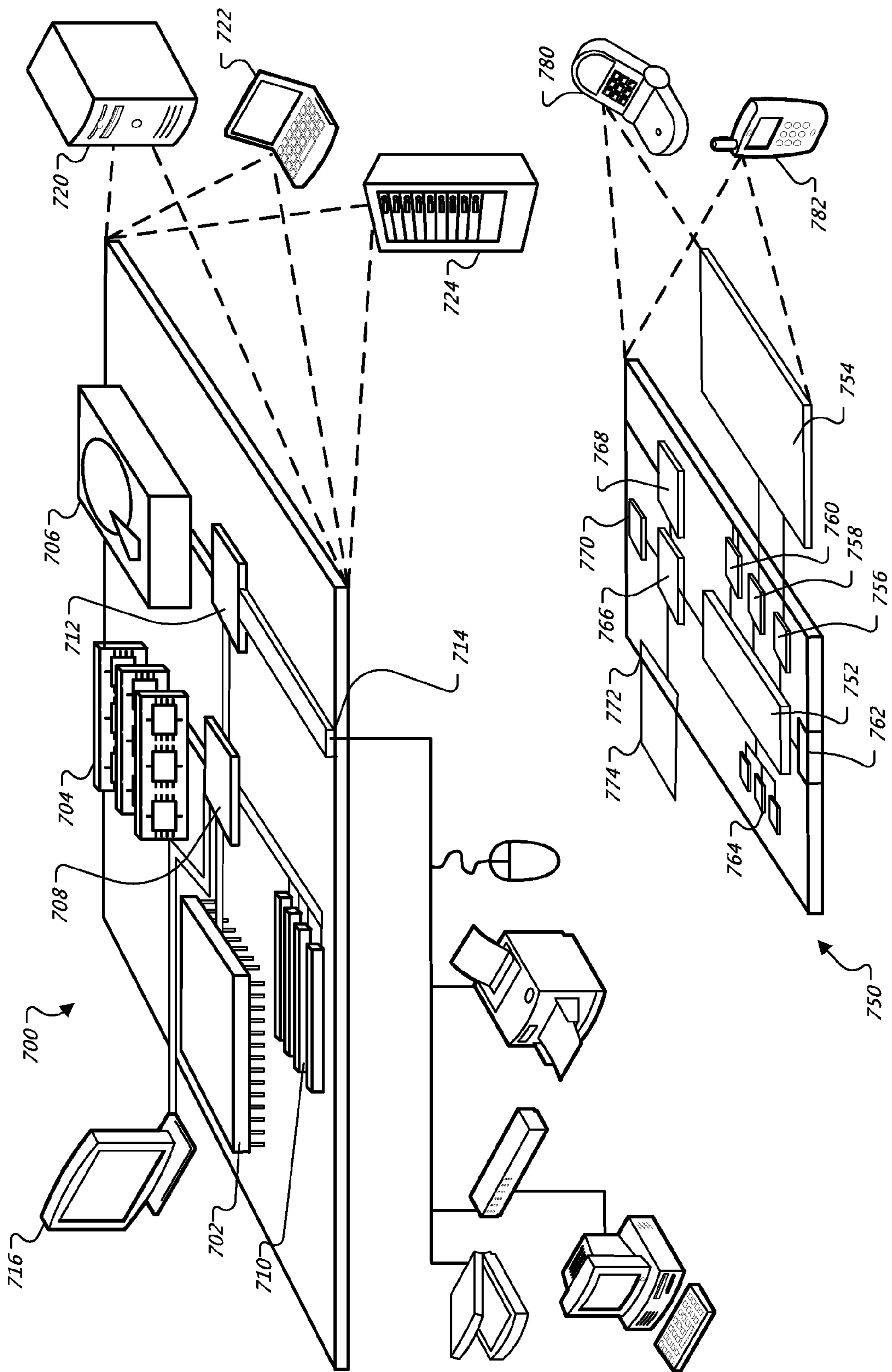
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low speed controller 712 manages lower bandwidth-intensive operations. Such allocation of functions is by way of example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, some of which are shown in the figure. For example, it may be implemented as a cellular telephone 780. It may also be implemented as part of a smartphone 782, personal digital assistant, or other similar mobile device.

Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:

presenting, by a computing system, while the computing system is in an unlocked state, an indication of a plurality of graphical user interface elements that are to be presented when the computing system is in a locked state and are to be available for selection in various sequences to cause the computing system to transition from the locked state to the unlocked state;

receiving, by the computing system, while the computing system is in the unlocked state, first user input that:

(a) specifies a first sequence of at least three of the graphical user interface elements, and (b) associates the first sequence of at least three of the graphical user interface elements with a corresponding first action that the computing system is configured to perform upon receipt of user input that selects the first sequence of at least three of the graphical user interface elements when the computing system is in the locked state;

receiving, by the computing system, while the computing system is in the unlocked state, second user input that:

(c) specifies a second sequence of at least three of the graphical user interface elements, and (d) associates the second sequence of at least three of the graphical user interface elements with a corresponding second action that the computing system is configured to perform upon receipt of user input that selects the second sequence of at least three of the graphical user interface elements when the computing system is in the locked state, wherein the first sequence is different from the first sequence, wherein the first action is different from the second action, displaying, by the computing system, while the computing system is in the locked state, the plurality of graphical user interface elements that are available for selection in various sequences to cause the computing system to transition from the locked state to the unlocked state;

receiving, by the computing system, while the computing system is in the locked state, third user input that selects a particular sequence of at least three of the graphical user interface elements;

comparing, by the computing system, while the computing system is in the locked state, the particular sequence of at least three of the graphical user interface elements with the first sequence of at least three of the graphical user interface elements and the second sequence of at least three of the graphical user interface elements to determine whether the particular sequence matches either of the first sequence and the second sequence, wherein the first sequence and the second sequence are each associated with a same level of unlocked security access to the computing system; and responding, by the computing system, to a determination that the particular sequence matches one of the first sequence and the second sequence by:

(i) causing the computing system to transition from the locked state to the unlocked state, and (ii) performing the action that corresponds to the one of the first sequence and the second sequence that matches the particular sequence.

2. The computer-implemented method of claim 1, wherein, during the third user input that defines the particular sequence of at least three of the graphical user interface elements and before the user input completes the particular sequence, the computing system does not provide a visual indication of the action that corresponds to the particular sequence.

3. The computer-implemented method of claim 1, wherein each of the plurality of graphical user interface elements is a generic user interface element that does not visually identify the first action and does not visually identify the second action.

4. The computer-implemented method of claim 1, further comprising recognizing, by the computing system, completion of the particular sequence of at least three of the graphical interface elements upon identifying that the third user input selected one of the graphical user interface elements.

5. The computer-implemented method of claim 1, wherein the first sequence of at least three of the graphical interface elements and the second sequence of at least three of the graphical interface elements both involve user selections of a same one of the graphical user interface elements to begin the first sequence and the second sequence.

6. The computer-implemented method of claim 1, wherein the third user input that selects the particular sequence of at least three of the graphical user interface elements is provided with the third user input contacting a touchscreen display of the computing system without the third user input releasing from the touchscreen display of the computing system.

7. The computer-implemented method of claim 1, wherein receiving the third user input that selects the particular sequence of at least three of the graphical interface elements comprises receiving user input that contacts a touchscreen of the computing system and traces a path that moves across the touchscreen and that contacts regions of the touchscreen at which the at least three of the graphical user interface elements in the particular sequence are displayed.

8. The computer-implemented method of claim 1, wherein the first action and the second action include at least two of the following actions: (a) launch a home screen of the computing system, (b) launch an email application program, (c) launch a telephone application program, (d) launch a web browser application program, and (e) launch a camera application program.

9. One or more computer-readable devices including instructions that, when executed by at least one programmable computer processor, cause performance of a method that comprises:

presenting, by a computing system, while the computing system is in an unlocked state, an indication of a plurality of graphical user interface elements that are to be presented when the computing system is in a locked state and are to be available for selection in various sequences to cause the computing system to transition from the locked state to the unlocked state;

receiving, by the computing system, while the computing system is in the unlocked state, first user input that:

(a) specifies a first sequence of at least three of the graphical user interface elements, and (b) associates the first sequence of at least three of the graphical user interface elements with a corresponding first action that the computing system is configured to perform upon receipt of user input that selects the first sequence of at least three of the graphical user interface elements when the computing system is in the locked state;

receiving, by the computing system, while the computing system is in the unlocked state, second user input that:

(c) specifies a second sequence of at least three of the graphical user interface elements, and (d) associates the second sequence of at least three of the graphical user interface elements with a corresponding second action that the computing system is configured to perform upon receipt of user input that selects the second sequence of at least three of the graphical user interface elements when the computing system is in the locked state, wherein the first sequence is different from the first sequence, wherein the first action is different from the second action, displaying, by the computing system, while the computing system is in the locked state, the plurality of graphical user interface elements that are available for selection in various sequences to cause the computing system to transition from the locked state to the unlocked state;

receiving, by the computing system, while the computing system is in the locked state, third user input that selects a particular sequence of at least three of the graphical user interface elements;

comparing, by the computing system, while the computing system is in the locked state, the particular sequence of at least three of the graphical user interface elements with the first sequence of at least three of the graphical user interface elements and the second sequence of at least three of the graphical user interface elements to determine whether the particular sequence matches either of the first sequence and the second sequence, wherein the first sequence and the second sequence are each associated with a same level of unlocked security access to the computing system; and responding, by the computing system, to a determination that the particular sequence matches one of the first sequence and the second sequence by:

(i) causing the computing system to transition from the locked state to the unlocked state, and (ii) performing the action that corresponds to the one of the first sequence and the second sequence that matches the particular sequence.

10. The one or more computer-readable devices of claim 9, wherein, during the third user input that defines the particular sequence of at least three of the graphical user interface elements and before the user input completes the particular sequence, the computing system does not provide a visual indication of the action that corresponds to the particular sequence.

11. The one or more computer-readable devices of claim 9, wherein each of the plurality of graphical user interface elements is a generic user interface element that does not visually identify the first action and does not visually identify the second action.

12. The one or more computer-readable devices of claim 9, wherein the operations further comprise recognizing, by the computing system, completion of the particular sequence of at least three of the graphical interface elements upon identifying that the third user input selected one of the graphical user interface elements.

13. The one or more computer-readable devices of claim 9, wherein the first sequence of at least three of the graphical interface elements and the second sequence of at least three of the graphical interface elements both involve user selections of a same one of the graphical user interface elements to begin the first sequence and the second sequence.

14. The one or more computer-readable devices of claim 9, wherein the third user input that selects the particular sequence of at least three of the graphical user interface elements is provided with the third user input contacting a touchscreen display of the computing system without the third user input releasing from the touchscreen display of the computing system.

15. The one or more computer-readable devices of claim 9, wherein receiving the third user input that selects the particular sequence of at least three of the graphical interface elements comprises receiving user input that contacts a touchscreen of the computing system and traces a path that moves across the touchscreen and that contacts regions of the touchscreen at which the at least three of the graphical user interface elements in the particular sequence are displayed.

16. The one or more computer-readable devices of claim 9, wherein the first action and the second action include at least two of the following actions: (a) launch a home screen of the computing system, (b) launch an email application program, (c) launch a telephone application program, (d) launch a web browser application program, and (e) launch a camera application program 40.

* * * * *